US012164214B2

(12) United States Patent
Briese (10) Patent No.: US 12,164,214 B2
(45) Date of Patent: Dec. 10, 2024

(54) LIGHTING UNIT COMPRISING AN HMI LIGHT AND FLASH TUBES, LIGHTING DEVICE COMPRISING A LIGHTING UNIT, AND REFLECTOR ASSEMBLY COMPRISING A LIGHTING DEVICE

(71) Applicant: Hans-Werner Friedrich Briese, Hamburg (DE)

(72) Inventor: Hans-Werner Friedrich Briese, Hamburg (DE)

( * ) Notice: Subject to any disclaimer, the term of this patent is extended or adjusted under 35 U.S.C. 154(b) by 114 days.

(21) Appl. No.: 17/787,049

(22) PCT Filed: Dec. 15, 2020

(86) PCT No.: PCT/EP2020/086127
§ 371 (c)(1),
(2) Date: Jun. 17, 2022

(87) PCT Pub. No.: WO2021/122534
PCT Pub. Date: Jun. 24, 2021

(65) Prior Publication Data
US 2023/0029416 A1 Jan. 26, 2023

(30) Foreign Application Priority Data
Dec. 20, 2019 (DE) .......................... 102019135534.6

(51) Int. Cl.
*G03B 15/05* (2021.01)
(52) U.S. Cl.
CPC ...... *G03B 15/05* (2013.01); *G03B 2215/0514* (2013.01); *G03B 2215/0532* (2013.01);
(Continued)
(58) Field of Classification Search
CPC ............ G03B 15/05; G03B 2215/0514; G03B 2215/0532; G03B 2215/0553; G03B 2215/0582; G03B 15/02; G03B 15/07
See application file for complete search history.

(56) References Cited

U.S. PATENT DOCUMENTS 5,381,324 A 1/1995 Hillstrom et al.
5,841,146 A 11/1998 Briese
(Continued)

FOREIGN PATENT DOCUMENTS

DE 1952170 A1 5/1971
DE 2606650 B1 8/1977
(Continued)

OTHER PUBLICATIONS

International Search Report dated Apr. 8, 2021; International Application PCT/EP2020/086127.
(Continued)

*Primary Examiner* — Kevin Quarterman
(74) *Attorney, Agent, or Firm* — Dinsmore & Shohl LLP (57) ABSTRACT

A lighting unit, configured and adapted for illuminating subjects for photography and filming, has a connecting element that comprises, on the one hand, plug-in locations configured and adapted to receive at least two light sources, and, on the other hand, contacts configured and adapted to be connected to a generator, the contacts being electrically connected to the plug-in locations. At least two light sources are inserted into the plug-in locations. A substantially transparent protective cover is connected to the connecting element and at least partially encloses each of the light sources connected to the connecting element. One light source is designed as an HMI (Hydrargyrum Medium-Arc Iodide) light and the at least one other light source is designed as a flash tube. A lighting device including a lighting unit, and a reflector assembly with a lighting device, are also disclosed.

13 Claims, 4 Drawing Sheets

(52) U.S. Cl.
CPC .............. *G03B 2215/0553* (2013.01); *G03B 2215/0582* (2013.01)

(56) References Cited

U.S. PATENT DOCUMENTS

| | | | |
|---|---|---|---|
| 8,702,255 B2 | 4/2014 | Baxter et al. | |
| 2007/0052397 A1* | 3/2007 | Thompson | H02M 1/4208 323/223 |
| 2010/0265690 A1* | 10/2010 | Portmann | G03B 15/05 362/6 |
| 2011/0069472 A1* | 3/2011 | Peregrine | G03B 15/02 248/314 |
| 2013/0322051 A1* | 12/2013 | Ortiz-Gavin | G03B 15/06 362/17 |
| 2014/0198250 A1* | 7/2014 | Delzell | G03B 15/02 362/11 |
| 2014/0218936 A1 | 8/2014 | Mahling et al. | |
| 2015/0062862 A1 | 3/2015 | Baxter et al. | |

FOREIGN PATENT DOCUMENTS

| | | | |
|---|---|---|---|
| DE | 7604912 | U1 | 1/1978 |
| DE | 2839097 | A1 | 3/1980 |
| DE | 8034603 | U1 | 5/1981 |
| DE | 3124757 | A1 | 2/1983 |
| DE | 3938228 | A1 | 5/1991 |
| DE | 19618434 | C1 | 11/1997 |
| DE | 10118290 | A1 | 10/2002 |
| DE | 102013002202 | A1 | 8/2014 |
| JP | H06111715 | A | 4/1994 |
| JP | H07262969 | A | 10/1995 |
| JP | H08505260 | A | 6/1996 |
| JP | H08171803 | A | 7/1996 |
| JP | H1061877 | A | 3/1998 |
| JP | 2002032049 | A | 1/2002 |
| JP | 2006227154 | A | 8/2006 |
| JP | 2017004725 | A | 1/2017 |
| WO | 03065118 | A1 | 8/2003 |
| WO | 2008036978 | A2 | 3/2008 |
| WO | 2009027012 | A1 | 3/2009 |

OTHER PUBLICATIONS

JP Notice of Reasons for Refusal dated Aug. 27, 2024 pertaining to JP application No. 2022-538138 filed Jun. 20, 2022, pp. 1-7.

* cited by examiner

LIGHTING UNIT COMPRISING AN HMI LIGHT AND FLASH TUBES, LIGHTING DEVICE COMPRISING A LIGHTING UNIT, AND REFLECTOR ASSEMBLY COMPRISING A LIGHTING DEVICE

CROSS-REFERENCE TO RELATED APPLICATIONS

This application is the U.S. National Stage of PCT/EP2020/086127 filed on Dec. 15, 2020, which claims priority to German Patent Application 102019135534.6 filed on Dec. 20, 2019, the entire content of both are incorporated herein by reference in their entirety.

FIELD OF THE INVENTION

The invention relates to a lighting unit configured and adapted for illuminating subjects for photography and filming.

The invention also relates to a lighting device configured and adapted for illuminating subjects for photography and filming.

The invention further relates to a reflector assembly configured and adapted to provide illumination for photography and filming.

BACKGROUND OF THE INVENTION

Lighting units are used in photography and filming to illuminate or light up the subject to be photographed or filmed. Subject means anything that can be captured by photography or filming, but especially people, for example portraits or sporting activities, and/or objects, such as clothing, food, and/or nature. Characteristics of the subject, such as contours, colour fidelity, shadowing etc. can be influenced, for example reduced or emphasised, by means of the lighting or illumination of the subject. With regard to the choice of light sources, photography has different needs and requirements compared to filming. In photography, lighting units are used in which a light source such as a halogen bulb, halogen bar or any other halogen-based light source, is configured and adapted to provide a so-called modelling light. A second light source is a flash tube, which produces the actual, brief (flash-like) illumination of the subject. In filming, lighting units are used in which longer (corresponding to the film sequence) illumination of the subject, close to daylight, is produced by an HMI light as the only light source in order to provide a continuous light.

Therefore, known lighting units are designed and adapted only for taking photographs, that is to say, still images, and thus have a modelling light and at least one flash light, or they are configured and adapted only for making films, that is to say, moving images, and thus have an HMI light. To operate a lighting device comprising a lighting unit for photography, an energy source, for example in the form of a generator, is required to supply energy for the modelling light and the ignition coils for each flash light. To operate a lighting device comprising a lighting unit for filming, an energy source, for example in the form of a generator, is required to supply energy for ionising the gas path between the electrodes of the HMI light and for a ballast to limit the current input to the HMI light after gas discharge has taken place. Put simply, lighting devices comprising different sets of equipment exist for photography and for filming.

Consequently, if both photography and filming are to be carried out on a photo and film set, a considerable amount of conversion work has to be done with regard to the lighting situation, leading to considerably higher production costs, partly due to the longer studio hire periods. A further disadvantage of the separate functionalities of known lighting units is that separate equipment is needed in each case, for example lighting units, generators, ballasts, ignition units, ignition coils and the like, adapted to the requirements of the photo shoots and film shoots in question, which, given the diverse nature of the individual parts, demands greater logistical effort when setting up the photo and film set and correspondingly higher costs. Furthermore, the individual characteristics of subjects cannot be fully presented to best effect. In other words, known lighting units for both photography and filming are merely a compromise at the expense of maximum photo and film quality.

SUMMARY OF THE INVENTION

The lighting units can be traded and used independently, for example as replacement parts or spares. Usually, however, the lighting units are part of a lighting device, which in turn is preferably part of a reflector assembly.

The invention is thus based on the task of creating a reliable and safe lighting unit that is universally usable for photography and filming and optimises the individual lighting situation. The task further consists in proposing a corresponding lighting device and a corresponding reflector assembly.

This task is solved by a lighting unit as mentioned above, characterised by a connecting element that comprises: on the one hand, plug-in locations configured and adapted to receive at least two light sources, and, on the other hand, contacts configured and adapted to be connected to a generator, the contacts being electrically connected to the plug-in locations; at least two light sources inserted into the plug-in locations; and a substantially transparent protective cover which is connected to the connecting element and at least partially encloses each of the light sources connected to the connecting element, one light source being designed as an HMI light and the at least one other light source being designed as a flash tube. The connecting element forms a plate-like base of the lighting unit, the connecting element itself not being electrically conductive, but having plug-in locations on one side in which the light sources are inserted, screwed or otherwise preferably detachably mounted, and having electrically conductive terminals on the opposite side, that is to say, contacts which are electrically connected to the plug-in locations. All light sources are completely surrounded by the protective cover, with the exception of ventilation openings for heat dissipation. The lighting unit according to the invention with an HMI light and at least one flash tube provides, for the first time, a type of combination lamp that can be used for both photography and filming without conversion work. By selectively actuating/triggering the HMI light and/or flash tube, the same equipment can be used to provide continuous light for filming and modelling light and/or flash light for photography. The combination of different light sources in one lighting unit offers the possibility of capturing new or particularly emphasised characteristics in photography and filming that make the photographs and films appear more "alive". In particular, the lighting unit according to the invention delivers particularly high colour fidelity, which makes the images appear especially lifelike.

Advantageously, an igniter and a ballast are assigned to the HMI light and an ignition coil is assigned to the flash tube. The igniter for the HMI light can be placed outside the lighting unit as a separate component, preferably at a short distance of less than 1 metre, for example. Optionally, the igniter can also be an integral part of the lighting unit. The same applies to the ballast, which can be an integral part of the lighting unit, but is preferably designed separately from the lighting unit and is disposed in particular in a generator (further described below), which is configured and adapted to supply energy to the lighting unit. The ignition coil for the flash tube can also be disposed separately from the lighting unit or—preferably— be an integral part of it.

In a particularly preferred further development of the lighting unit, in addition to the HMI light, at least two flash tubes disposed inside the protective cover are electrically connected to the contacts and inserted into the connecting element, an ignition coil being assigned to each flash tube. It is possible to have a common ignition coil for both flash tubes. Preferably, a separate ignition coil is assigned to each flash tube. The same applies if more than two flash tubes are provided. In particular, four flash tubes may be provided.

A particularly preferred embodiment of the lighting unit is characterised in that the HMI light is disposed centrally within the protective cover and the at least two flash tubes are disposed symmetrically relative to the HMI light. Four flash tubes, for example, can also be evenly distributed around the periphery of the HMI light. More precisely, the flash tubes are unevenly or preferably evenly distributed and positioned around a glass bulb of the HMI light.

Expediently, the protective cover is detachably mounted on the connecting element and is cylindrical in shape, the connecting element being disposed at one end side of the protective cover and an air-permeable protective cap being disposed at the opposite end side to the connecting element. For example, the cylindrical protective cover can be mounted on the connecting element by means of a locking screw. Detachability means that light sources can be changed quickly and easily. The connecting element closes off one end side of the cylindrical protective cover. The air-permeable protective cap at the opposite end of the cylindrical protective cover can be, for example, a wire mesh or similar, which on the one hand allows heat to escape from the space enclosed by the protective cover surrounding the light sources and on the other hand serves as splinter protection against shattering light sources, for example.

Preferably, the protective cover is made of glass, the glass being at least partially provided with a UV filter. Finally, the protective cover is preferably a glass cylinder open at both end sides. Other suitable and appropriately heat-resistant materials can be used instead of glass. The UV protection, which can extend over the entire surface of the glass cylinder or parts thereof, so that the glass cylinder is at least partially designed as a UV protective screen, provides effective and necessary protection against the UV rays emitted by the HMI light.

Preferably, all light sources have a similar colour temperature of around 5600 Kelvin with a variable spectrum. However, almost any other colour temperature ranges are also possible, a colour temperature range of 5200 to 6200 preferably being chosen for photography and filming. The decisive point is that the light sources, in this case the HMI light and the flash tubes, have colour temperatures in the same order of magnitude.

Particularly advantageously, the connecting element has 18-pole terminals on the side facing away from the light sources. This provides a wide range of contact options. Connection bodies with a different number of contacts and configured differently relative to each other can also be used, however, the number and positioning also depending on the number of light sources and their positioning in the connecting element.

The task is also solved by a lighting device characterised by a lighting unit as disclosed herein plus a common energy source configured and adapted to selectively operate and/or ignite an HMI light and/or flash tubes. The resulting advantages have already been described in relation to the lighting unit, therefore reference is made to the relevant passages so as to avoid repetition. The design of the lighting device according to the invention means that there is a single set of equipment for photography and filming, so that conversion becomes unnecessary and the range of parts is reduced. In other words, a single set of equipment effectively saves time and space and greatly simplifies parts logistics, resulting in significant cost reductions.

The power source is preferably a generator comprising a ballast configured and adapted to limit the current input to the HMI light. The generator has a plurality of connection sockets to connect the light sources of the lighting unit to the generator via cable. The ballast for the HMI light can optionally be configured and adapted separately outside the generator.

The lighting device preferably further comprises a control device configured and adapted to individually actuate the light sources of the lighting unit. By means of the control device it is possible to individually select whether only the HMI light or only one flash tube or both flash tubes or the HMI light and one or two flash tubes are actuated and triggered so as to provide optimum lighting for each application. The control device can be designed separately from the generator or be an integral part of it.

Particularly preferably, the generator comprises a detection device configured and adapted to detect the connected light sources of the lighting unit. This detection device can be mechanical and/or electronic. The detection device is preferably connected to the control device in order to be able to receive and process the signals emitted by the detection device.

In a further advantageous embodiment, the generator is configured and adapted to generate short flash durations with the flash tubes, such that flashes for capturing 60 to 120 images per second can be generated with each flash tube. This design makes it possible, for the first time, to shoot film using flash alone, so that the many individual images can be put together with extreme sharpness to create a high-quality film.

The task is also solved by a reflector assembly as mentioned above, characterised by a reflector umbrella, a lighting device, and a carrier element for receiving at least parts of the lighting device. The advantages resulting from the lighting unit have already been described in relation to the lighting unit, therefore reference is made to the relevant passages so as to avoid repetition. The above-mentioned advantages are particularly effective in combination with the lighting device and the reflector umbrella.

The lighting unit is preferably disposed at a free end of the carrier element, wherein the carrier element, as a focusing unit for the lighting unit, is axially movable in the longitudinal direction of the centre axis of the focusing unit or of the reflector umbrella relative to the latter. This allows the illuminating effects and characteristics enabled by the lighting unit to be used to particular advantage.

BRIEF DESCRIPTION OF THE DRAWINGS

Further useful and/or advantageous features and further developments of the lighting unit, lighting device and reflector assembly can be seen disclosed herein. Particularly preferred embodiments are explained in more detail with reference to the attached drawings.

DETAILED DESCRIPTION OF THE INVENTION

The lighting unit 10, lighting device 30 and reflector assembly 40 shown in the drawing are configured and adapted for lighting/illuminating all kinds of subjects for photography and filming.

The lighting unit 10 according to the invention is characterised by a connecting element 11 that comprises on the one hand, plug-in locations configured and adapted to receive at least two light sources, and, on the other hand, contacts 12 configured and adapted to be connected to a generator 13, the contacts 12 being electrically connected to the plug-in locations, at least two light sources inserted into the plug-in locations, and a substantially transparent protective cover 14 which is connected to the connecting element 11 and at least partially encloses each of the light sources connected to the connecting element 11, one light source being designed as an HMI light 15 and the at least one other light source being designed as a flash tube 16.

Figure 3:
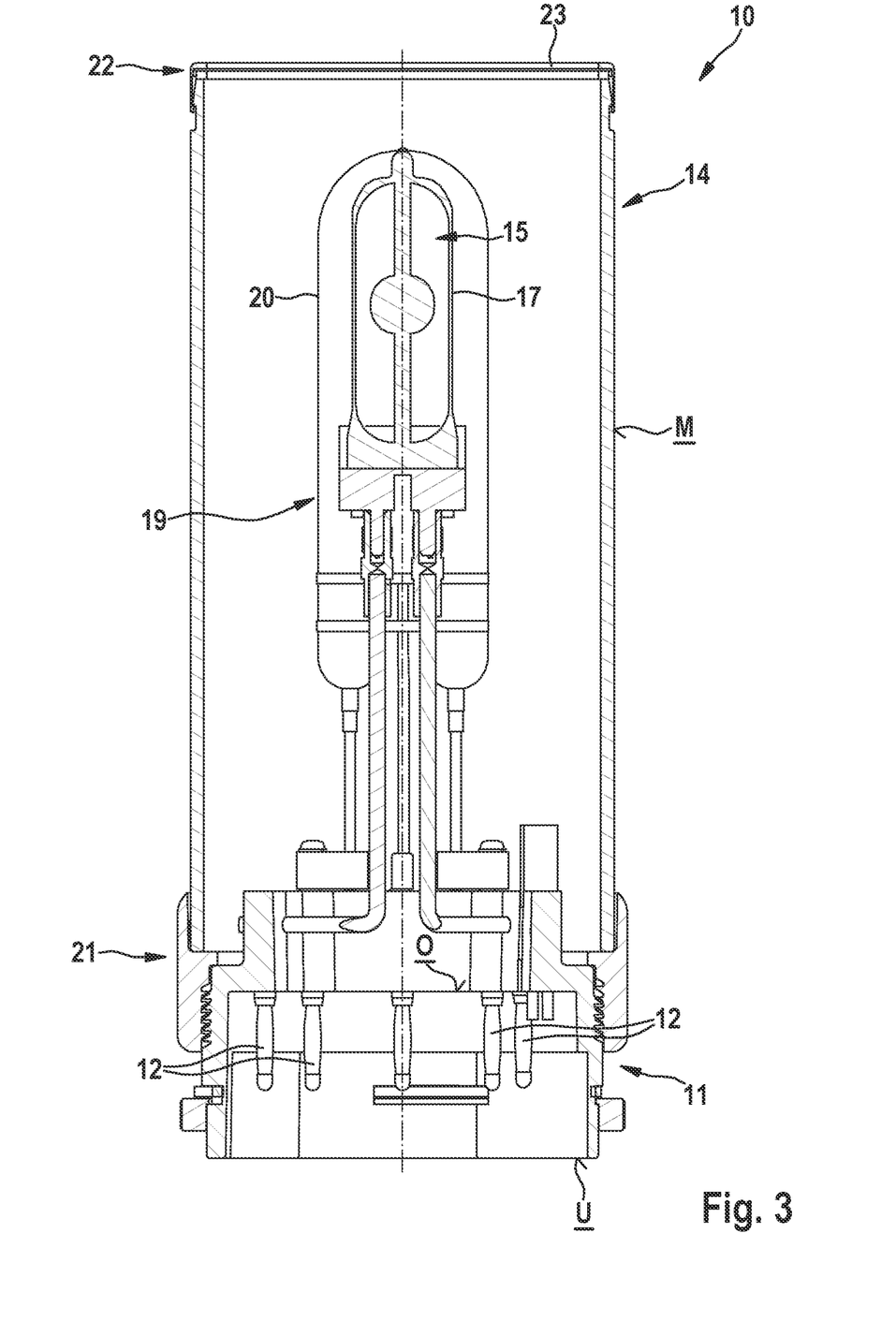
FIG. 3 shows the lighting unit according to FIG. 1 viewed along section A-A.

The contacts 12 do not usually go directly onto or into the generator 13 (see below). The plug-in locations are disposed on an upper side O of the connecting element 11 facing the protective cover 14. The plug-in locations can be configured for plug-in connection, screw connection, snap-in connection or any other type of detachable connection. The contacts 12 or terminals are formed on the underside U of the connecting element 11. The HMI light 15 and the or each flash tube 16 are preferably disposed at the same height. This means that they are disposed one behind the other when viewed from the side (see FIG. 3, for example).

The HMI light 15 has a glass bulb 18 filled with gas, the gas acting as an insulator between two electrodes in the cold state. A high-voltage discharge by the generator 13 makes the insulating gas between the electrodes conductive. Light is emitted due to the arc formed between the electrodes. After gas discharge has taken place, the gas is conductive, so that current flows through the gas. A ballast is used to limit the current. As the flash tube 16, preferably xenon flash tubes or krypton flash tubes as well as other common flash lights or flash tubes can be used. Each flash tube 16 also comprises a glass bulb 18 filled with a gas and two electrodes. By applying a sufficiently high voltage, a gas discharge or the formation of a spark takes place, representing the light flash. The necessary energy is provided by the generator 13.

The features and further developments described below represent preferred embodiments of the lighting unit, either individually or in combination with each other. It is expressly pointed out that features which are summarised in the description and/or the drawing or described in a common embodiment can also functionally and independently further form the lighting unit 10 described above.

As mentioned, a ballast is necessary for the operation of the HMI light 15. An igniter and a ballast are preferably assigned to the HMI light 15. Both the igniter and the ballast can be configured and adapted separately from the lighting unit 10. Preferably, however, at least the igniter is an integral part of the lighting unit 10 and is disposed in the area of the connecting element 11. An ignition coil is assigned to the flash tube 16. The ignition coil can also be an integral part of the lighting unit 10 and is then expediently disposed in the area of the connecting element 11. The or each ignition coil is preferably disposed outside the lighting unit 10 (see below).

In a particularly preferred embodiment, in addition to the HMI light 15, at least two flash tubes 16, 19 disposed inside the protective cover 14 are electrically connected to the contacts 12 and inserted into the connecting element 11, an ignition coil being assigned to each flash tube 16. Each flash tube 16, 19 can be assigned its own ignition coil. It is also possible to have a common ignition coil for all flash tubes 16, 19. The second flash tube 19 is preferably identical to the first flash tube 16 and also comprises a glass bulb 20 filled with gas and two electrodes. However, it is also possible to integrate different flash tubes 16, 19 in a lighting unit 10. The arrangement and positioning of the flash tubes 16, 19 inside the protective cover 14 relative to the HMI light 15 is variable. Particularly preferably, the HMI light 15 is disposed centrally inside the protective cover 14 and the two flash tubes 16, 19 are disposed symmetrically relative to the HMI light 15. In other words, the two flash tubes 16, 19 are offset by approximately 180° around the HMI light 15 or its glass cover 17. In other embodiments, for example with four flash tubes, these are preferably disposed evenly offset by 90° to each other around the HMI light 15 or its glass bulb 17.

Figure 1:
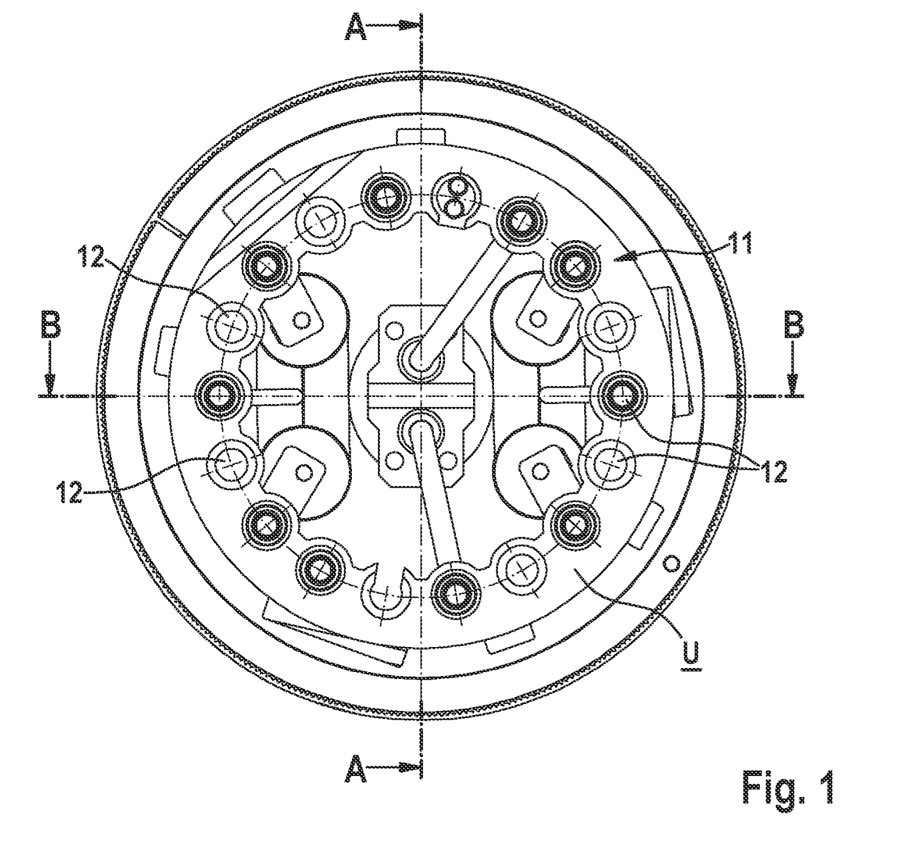
FIG. 1 shows a lighting unit according to the invention viewed from below looking towards the contacts of the connecting element.
Figure 2:
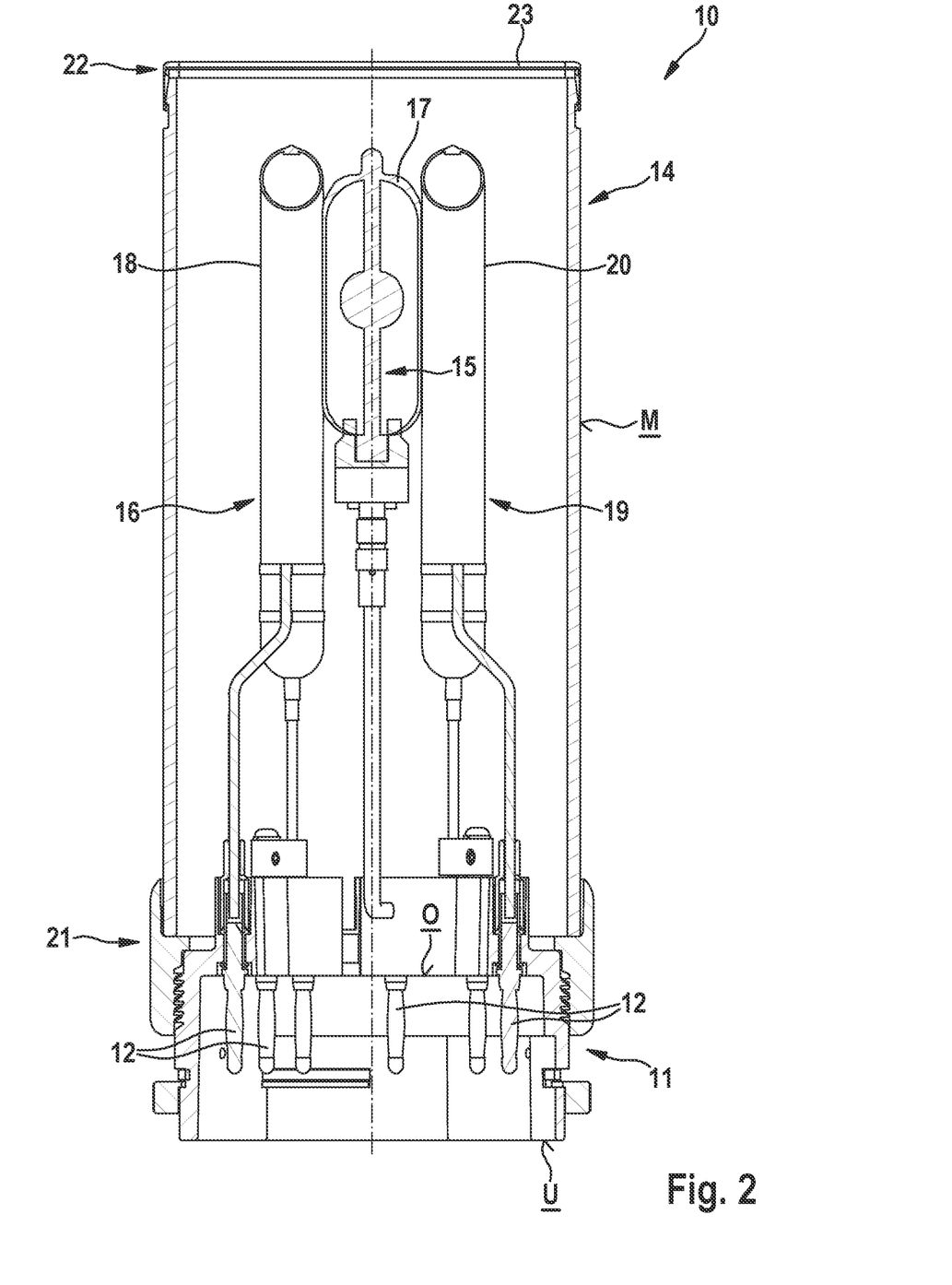
FIG. 2 shows the lighting unit according to FIG. 1 viewed along section B-B.

The protective cover 14 is detachably mounted on the connecting element 11 and is cylindrical in shape, the connecting element 11 being disposed at one end side 21 of the protective cover 14 and an air-permeable protective cap 23 being disposed at the opposite end side 22 to the connecting element 11. In simple embodiments, the protective cap 23 is connected to the connector body 11 by at least one locking screw. The protective cap 14 can however also be seated in a holder that is screwed to the connecting element 11. But it is also possible to use other methods of mounting the protective cover 14 with or on the connecting element 11. The protective cap 23 can be a simple wire mesh that is permeable to air. Other covering elements with apertures, slots or other air-permeable openings can also be used. Integrally with the protective cap 23 or separately from it, light filters can also be disposed in the area of the end side 22 of the protective cover 14. The HMI light 15 and the or each flash tube 16, 19 end at approximately the same height going towards the end side 22 (see e.g. FIGS. 2 and 3).

The protective cover 14 is preferably made of glass, the glass being at least partially provided with a UV filter. The UV filter may be integrated into the glass. However, the UV filter can also be attached separately from inside and/or outside the protective cover 14. The protective cover 14 preferably has a closed lateral surface M. However, in other examples, the lateral surface M may also have ventilation openings or similar.

All light sources, that is to say the HMI light 15 and each flash tube 16, 19, have a similar colour temperature of approx. 5600 Kelvin with a variable spectrum. In other examples and depending on the application, however, light sources with colour temperatures lower or higher than 5600 Kelvin can also be used. Light sources can also be used in a lighting unit 10 with different colour temperatures. The connecting element 11 can have a different number of contacts 12. Preferably, the connecting element 11 is designed with 18-pole terminals on the underside U facing away from the light sources.

As a lamp body, the lighting unit 10 is an independent component and as such can be used separately. Preferably, however, the lighting unit 10 is part of the lighting device 30. The lighting device 30, configured and adapted to illuminate subjects for photography and filming, is characterised by a lighting unit 10 disclosed herein, and a common power source configured and adapted to selectively operate and/or ignite an HMI light 15 and/or flash tubes 16, 19. The power source is a generator 13 comprising a ballast configured and adapted to limit the current input to the HMI light 15. As already explained, the ballast may be assigned to the lighting unit 10. Optionally, the ballast is an independent component. Preferably, however, the ballast is an integral part of the generator 13. The HMI light 15 is adjustable in a range preferably from 125 to 400 W via the generator 13, so that the HMI light 15 can also be used as a modelling light for flash photography.

The lighting unit 10 has connection plugs 31, 32 which are electrically connected to the contacts 12. The connection plugs 31, 32 can be connected directly or via cables 33, 34 to connection sockets 35, 36 of the generator 13.

The lighting device 30 comprises a control device configured and adapted to individually actuate the light sources of the lighting unit 10. The control device can be configured separately, but is preferably an integral part of the generator 13. The lighting device 30 or the generator 13 further comprises a detection device configured and adapted to detect the connected light sources of the lighting unit 10. The detection device is preferably connected to the control device. The generator 13 can have further connection sockets for connecting further components.

The generator 13 is configured and adapted in particular to generate short flash durations with the flash tubes 16, 19, such that flashes for capturing 60 to 120 images per second can be generated with each flash tube 16, 19. Ultimately, therefore, a correspondingly large number of flashes can be generated by means of the generator 13.

The lighting device 30 can be used in particular in conjunction with a reflector assembly 40, which is configured and adapted to provide illumination for photography and filming. The reflector assembly 40 is characterised by a reflector umbrella 41, a lighting device 30, and a carrier element 42 for receiving at least parts of the lighting device 30. In the embodiment shown in FIG. 4, the lighting unit 10 is disposed at a free end of the carrier element 42. The carrier element 42 itself is connected to the reflector umbrella 41 in the area of the umbrella holder 43. The connection plugs 31, 32 emerge from the opposite end of the carrier element 42 to the lighting unit 10. The ballast for the HMI light 15 can, for example, also be disposed in the head area 44. Igniters and/or ignition coils for the HMI light 15 and the flash tubes 16, 19 may also be disposed in the head area 44. According to the embodiment, the unit formed by the reflector umbrella 41 and the carrier element 42 is attached to a stand 45. In other options, the unit can also be attached to other support elements.

Figure 4:
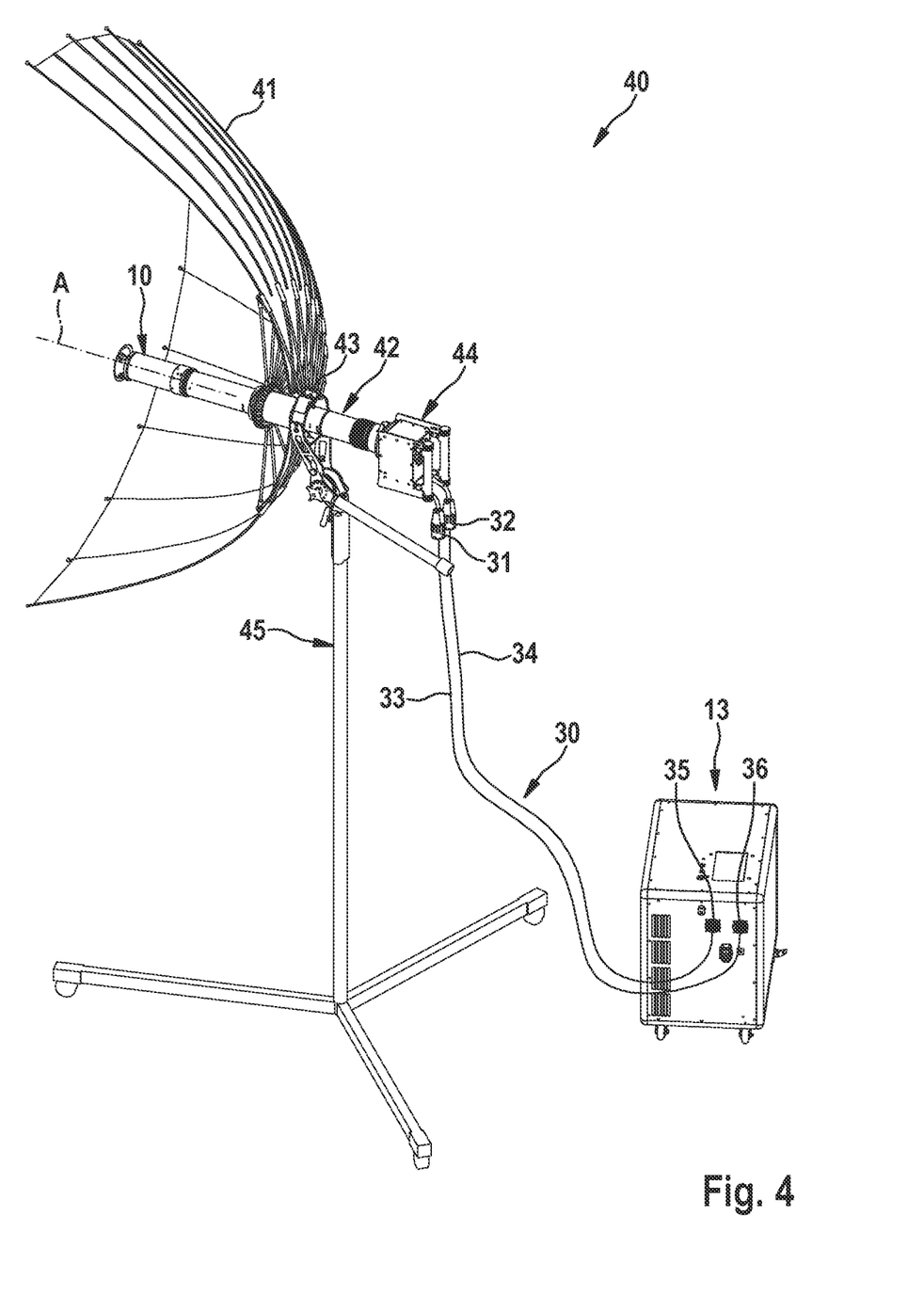
FIG. 4 shows a reflector assembly with the reflector umbrella in a partially cut out view.

As mentioned, the lighting unit 10 is preferably disposed at a free end of the carrier element 42, wherein the carrier element 42, as a focusing unit for the lighting unit 10, is axially movable in the longitudinal direction of the centre axis A of the focusing unit or of the reflector umbrella 41 relative to the latter.

The invention claimed is:

1. A lighting unit configured and adapted for illuminating subjects for photography and filming, comprising:
a connecting element having plug-in locations configured and adapted to receive at least two light sources and contacts configured and adapted to be connected to a generator, the contacts being electrically connected to the plug-in locations;
at least two light sources inserted into the plug-in locations; and
a substantially transparent protective cover connected to the connecting element and at least partially enclosing each of the light sources connected to the connecting element;
wherein one of the light sources is an HMI (Hydrargyrum Medium-Arc Iodide) light and the HMI light is centrally disposed inside the protective cover, electrically connected to the contacts, and inserted into the connecting element; and
wherein at least one other of the light sources comprises at least two flash tubes disposed inside the protective cover and symmetrically relative to the HMI light, electrically connected to the contacts, and inserted into the connecting element, and wherein an ignition coil is assigned to each flash tube.

2. The lighting unit according to claim 1, further comprising an igniter and a ballast assigned to the HMI light.

3. The lighting unit according to claim 1 or 2, wherein the protective cover is detachably mounted on the connecting element and is cylindrical in shape, the connecting element being disposed at one end side of the protective cover and an air-permeable protective cap being disposed at the opposite end side to the connecting element.

4. The lighting unit according to claim 1, wherein the protective cover is made of glass, the glass being at least partially provided with a UV filter.

5. The lighting unit according to claim 1, wherein all of the light sources have a similar colour temperature of approximately 5600 Kelvin with a variable spectrum.

6. The lighting unit according to claim 1, wherein the connecting element is designed with 18 terminals on a side facing away from the light sources.

7. A lighting device configured and adapted to illuminate subjects for photography and filming, comprising:
a lighting unit according to claim 1; and
a common power source configured and adapted to selectively operate and/or ignite an HMI light and/or a flash tube.

8. The lighting device according to claim 7, wherein the energy source is a generator comprising a ballast configured and adapted to limit a current input to the HMI light.

9. The lighting device according to claim 7, further comprising a control device configured and adapted to individually actuate the light sources of the lighting unit.

10. The lighting device according to claim 8, wherein the generator further comprises a detection device configured and adapted to detect connected light sources of the lighting unit.

11. The lighting device according to claim 8, wherein the generator is configured and adapted to generate short flash durations with the flash tube, such that flashes for capturing 60 to 120 images per second are generated with the flash tube.

12. A reflector assembly configured and adapted to provide illumination for photography and filming, comprising:
   a reflector umbrella;
   a lighting device according to claim 7; and
   a carrier element for receiving at least parts of the lighting device.

13. The reflector assembly according to claim 12, wherein:
   the lighting unit is disposed at a free end of the carrier element;
   the carrier element is a focusing unit for the lighting unit and is axially movable in a longitudinal direction of a centre axis of the focusing unit or of the reflector umbrella relative to the reflector umbrella.

* * * * *